Jan. 4, 1927. W. F. KASPER Re. 16,520

WHEEL

Original Filed Jan. 31, 1923

Inventor
WALTER F. KASPER
By Paul, Paul & Moore
ATTORNEYS

Reissued Jan. 4, 1927.

Re. 16,520

UNITED STATES PATENT OFFICE.

WALTER F. KASPER, OF FAIRMONT, MINNESOTA, ASSIGNOR TO FAIRMONT GAS ENGINE & RY. MOTOR CAR CO., OF FAIRMONT, MINNESOTA, A CORPORATION OF MINNESOTA.

WHEEL.

Original No. 1,515,212, dated November 11, 1924, Serial No. 616,065, filed January 31, 1923. Application for reissue filed April 6, 1925. Serial No. 21,223.

The object of my invention is to provide a wheel composed of a rim and a hub-supporting member pressed preferably from sheet metal and rigidly secured together to form a light but strong and durable two-piece wheel and one that is particularly adapted for railway motor cars.

A further object is to provide a wheel of the type described which can be easily and quickly assembled and when one member becomes worn or broken can be taken apart and a new piece substituted for the worn or broken member, thereby avoiding the necessity of throwing the entire wheel aside.

Other objects of the invention will appear from the following detailed description.

The invention consists generally in various constructions and combinations all as hereinafter described and particularly pointed out in the claims.

In the accompanying drawings forming a part of this specification,

Figure 2:
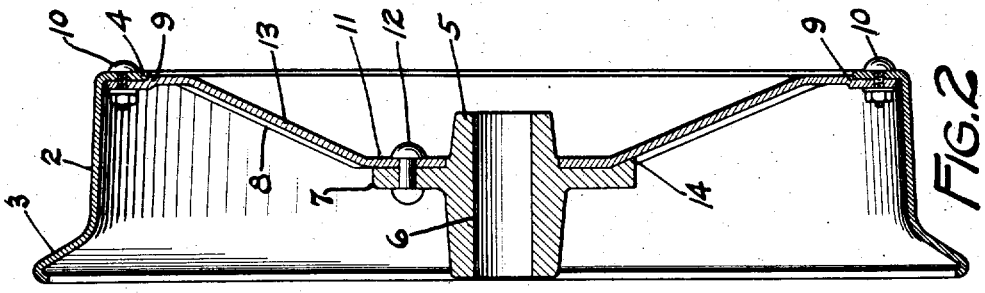
Figure 2 is a sectional view on the line 2—2 of Figure 1.
Figure 1:
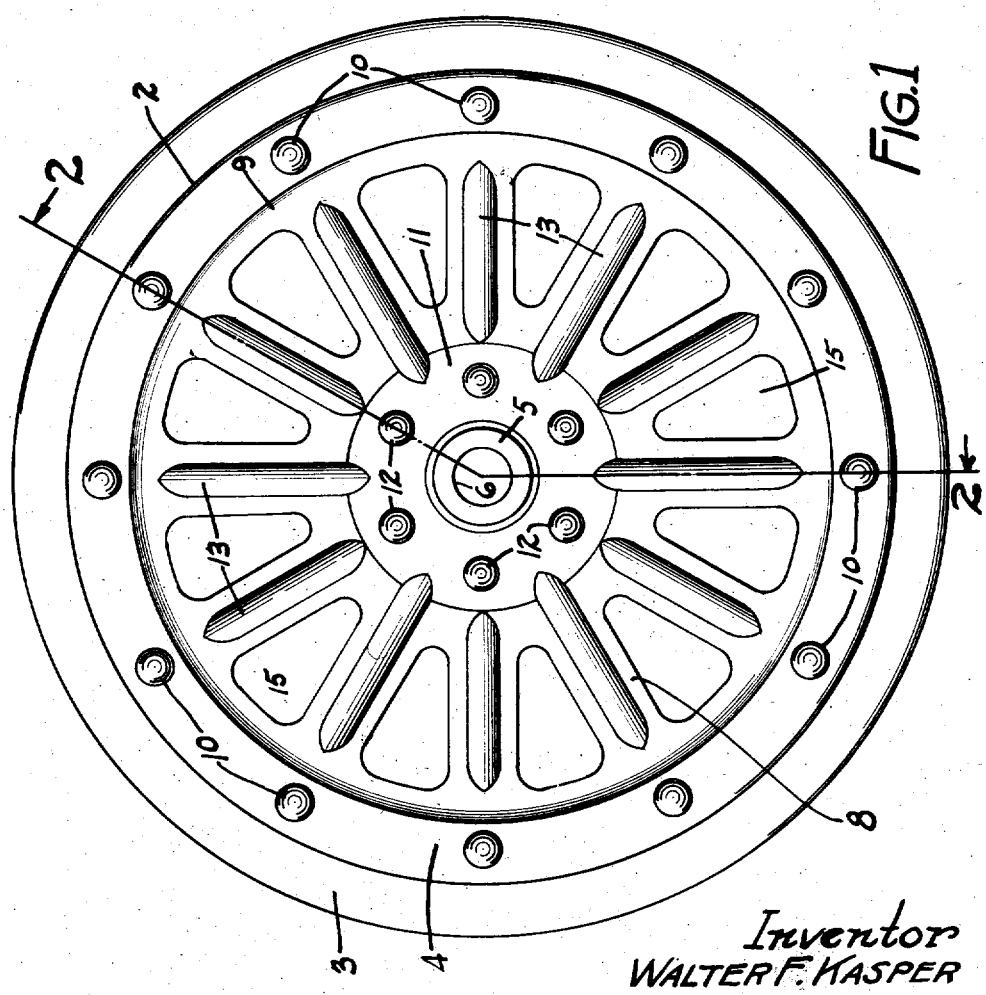
Figure 1 is a side view of a wheel embodying my invention.

In the drawing, 2 represents the rim of the wheel formed of one piece of metal, preferably sheet steel, pressed into a circular form with a rail flange 3 provided on one edge. At the other edge of the rim, an inwardly turned flange 4 is formed extending preferably around the wheel. A hub 5 is provided having a bearing 6 for the axle, and a radial flange 7 provided preferably intermediate to the ends of the hub. A sheet metal support 8, preferably of pressed steel, has a shoulder 9 formed in its outer portion to receive the edge of the flange 4; the outer edge of said support being seated on the inner surface of the flange and rigidly secured thereto by suitable means such as bolts 10.

From a point near the shoulder 9, the support 8, preferably disc-like in form, and forming the spokes of the wheel, extends obliquely to the center, and near the center has an annular flanged portion 11 enclosing a central opening through which the hub projects, said flanged portion being seated against the annular flange 7 and rigidly secured thereto by suitable means such as rivets 12.

For the purpose of strengthening the sheet metal support, to resist crushing stresses, I prefer to provide a series of radially extending ribs 13 pressed in the metal when the support is formed; said ribs forming correspondingly shaped grooves on one side in which lugs 14 provided at intervals on the flange 7 are seated, thereby locking the hub and its support against a relative rotary movement. The support also has openings 15 therein extending radially; these openings being formed when the plate is pressed out, and reducing to some little extent the weight of the wheel and the amount of metal in the hub supporting plate.

The advantages of this type of wheel will be immediately apparent. In case of wear or breakage of the rim, the bolts 10 can be easily and quickly removed and a new rim substituted for the worn one, without the necessity of casting the entire wheel aside. The parts being pressed by means of suitable dies, the wheel sections will all be interchangeable and the wheels can be quickly and easily assembled without adjusting or fitting.

I claim as my invention:

1. A wheel comprising a metal rim having an inwardly turned flange, a plate having an outer edge seated against said flange, and a shoulder to receive the edge of said flange, said plate extending diagonally from a point near said flange to the center of the wheel and having a central orifice, and a hub mounted in said orifice.

2. A wheel comprising a metallic rim, a plate fitting within said rim, and removably secured at its outer portion thereto, said plate having a central orifice, a hub fitting within said orifice and having a flange against which said plate is seated, means for securing said plate and flange together, said plate having radial grooves therein, and said hub flange having lugs to enter said grooves.

3. A wheel comprising a sheet metal rim having an outwardly projecting rail-engaging flange on one edge and an inwardly turned flange at its opposite edge, a metal disk fitting within said rim and having a central opening, a hub fitting within said opening and secured therein, said disk extending diagonally from said hub to said inwardly turned flange and having a surface fitting the surface of said flange, and means securing said disk and flange together.

4. A wheel comprising a metal rim having an outwardly projecting rail-engaging flange on one edge and an inwardly turned flange, a hub and supporting member therefor, said member extending diagonally from said hub to said inwardly turned flange and having a load-transmitting surface engaging the surface of said flange, and means securing said member and flange together.

5. A wheel comprising a rim formed of sheet steel and having a rail engaging flange on one side and an inwardly turned edge on its opposite side, a hub and supporting member therefor fitting within said rim, the outer portion of said member being seated on the inwardly turned edge of said rim for transmitting thereto the load from said hub, and means for securing said member and rim together.

6. A wheel comprising a rim formed of sheet metal and having an outwardly bent rail-engaging flange and also having an inwardly bent circumferential shoulder, a metal hub and spoke member having peripheral ledges bearing against said circumferential shoulder, to receive the load through said shoulder.

7. A wheel comprising a sheet metal rim having an outwardly bent rail engaging-flange, and also having an inwardly bent circumferential flange, a hub and spoke member, having ledges adapted to engage the inner periphery of said flange to transmit the load from the hub to the rim, said hub and spoke member adapted to engage said flange on that face nearest the engaging side of said rail-engaging flange.

8. A wheel comprising a sheet metal rim having an outwardly projecting rail engaging flange on one edge and an inwardly turned flange at its opposite edge, a hub and supporting member therefor within said rim, said member extending diagonally from said hub and having outer portions seated against the edge of said inwardly turned flange for transmitting the load thereto from said hub, and means for securing the outer portion of said supporting member to said flange.

In witness whereof, I have hereunto set my hand this 27th day of March 1925.

WALTER F. KASPER.